United States Patent [19]

Gustavsson

[11] 3,791,109

[45] Feb. 12, 1974

[54] GAS CLEANING APPARATUS

[75] Inventor: Karl Axel G. Gustavsson, Enkoping, Sweden

[73] Assignee: AB Bahco Ventilation, Enkoping, Sweden

[22] Filed: Sept. 7, 1971

[21] Appl. No.: 178,016

[30] Foreign Application Priority Data

Sept. 7, 1970 Sweden.............................. 12115/70

[52] U.S. Cl.......................... 55/229, 23/283, 55/73, 55/227, 55/239, 55/249, 55/432, 261/8, 261/119 R, 423/242

[51] Int. Cl............................................ B01d 47/02

[58] Field of Search...................... 55/228, 248–249, 55/229, 227, 239, 432; 261/119 R, 8; 210/519, 528; 23/283; 423/242

[56] References Cited

UNITED STATES PATENTS

| 2,894,637 | 7/1959 | Schreiber............................ 210/519 |
| 3,148,042 | 9/1964 | Harnisch et al....................... 55/229 |
| 3,653,511 | 4/1972 | Gustavsson et al................. 210/528 |
| 3,708,266 | 1/1973 | Gustavsson........................... 55/228 |
| 2,575,359 | 11/1951 | Ortgies................................ 55/228 X |
| 1,049,796 | 1/1913 | Anderson........................... 55/228 X |
| 1,123,232 | 1/1915 | Brassert et al. ...................... 55/248 |
| 2,792,905 | 5/1957 | Forrest................................ 55/249 X |
| 3,411,271 | 11/1968 | Gustavsson...................... 55/249 X |
| 3,608,281 | 9/1971 | Gustavsson........................... 55/228 |
| 3,640,053 | 2/1972 | Gustavsson........................... 55/248 |

FOREIGN PATENTS OR APPLICATIONS

| 1,171,955 | 11/1969 | Great Britain...................... 55/249 |
| 117,256 | 7/1969 | Norway............................... 55/249 |
| 102,024 | 4/1963 | Norway............................... 55/248 |

Primary Examiner—Tim R. Miles
Assistant Examiner—Vincent Gifford
Attorney, Agent, or Firm—Klarquist, Sparkman, Campbell, Leigh, Hall & Whinston

[57] ABSTRACT

A gas cleaning apparatus is described having a common container for a liquid take-up zone and a sedimentation zone. The container is normally closed except for first and second casings which extend downwardly from the top of the container and have open lower ends. The first casing has a top open to the atmosphere and the second casing is an inlet chamber having its top portion connected to a conduit for gas to be cleaned. A vacuum maintained in the container causes liquid levels in the casings to be below a liquid level in the container. A vertically extending gas treatment passage has a lower end terminating above the liquid level of the liquid take-up zone in the second casing and the other end connected to a liquid droplet separator in turn connected to a suction fan to draw a mixture of liquid droplets and gas to be cleaned upwardly through the treatment passage into the droplet separator. The upper end of this passage is connected to the top of the container to maintain the vacuum in the container. Liquid separated in the droplet separator is returned by a conduit into the lower end of the second casing at a position spaced above the sedimentation zone so that any solids can settle as sludge in the container. Rotating scrapers driven by a shaft extending downwardly through the first casing move settled sludge toward a discharge valve at the lower end of the conical bottom. The valve is operated in response to the load on the motor to open the valve to discharge sludge. A level detector in the container controls the introduction of make-up liquid.

3 Claims, 3 Drawing Figures

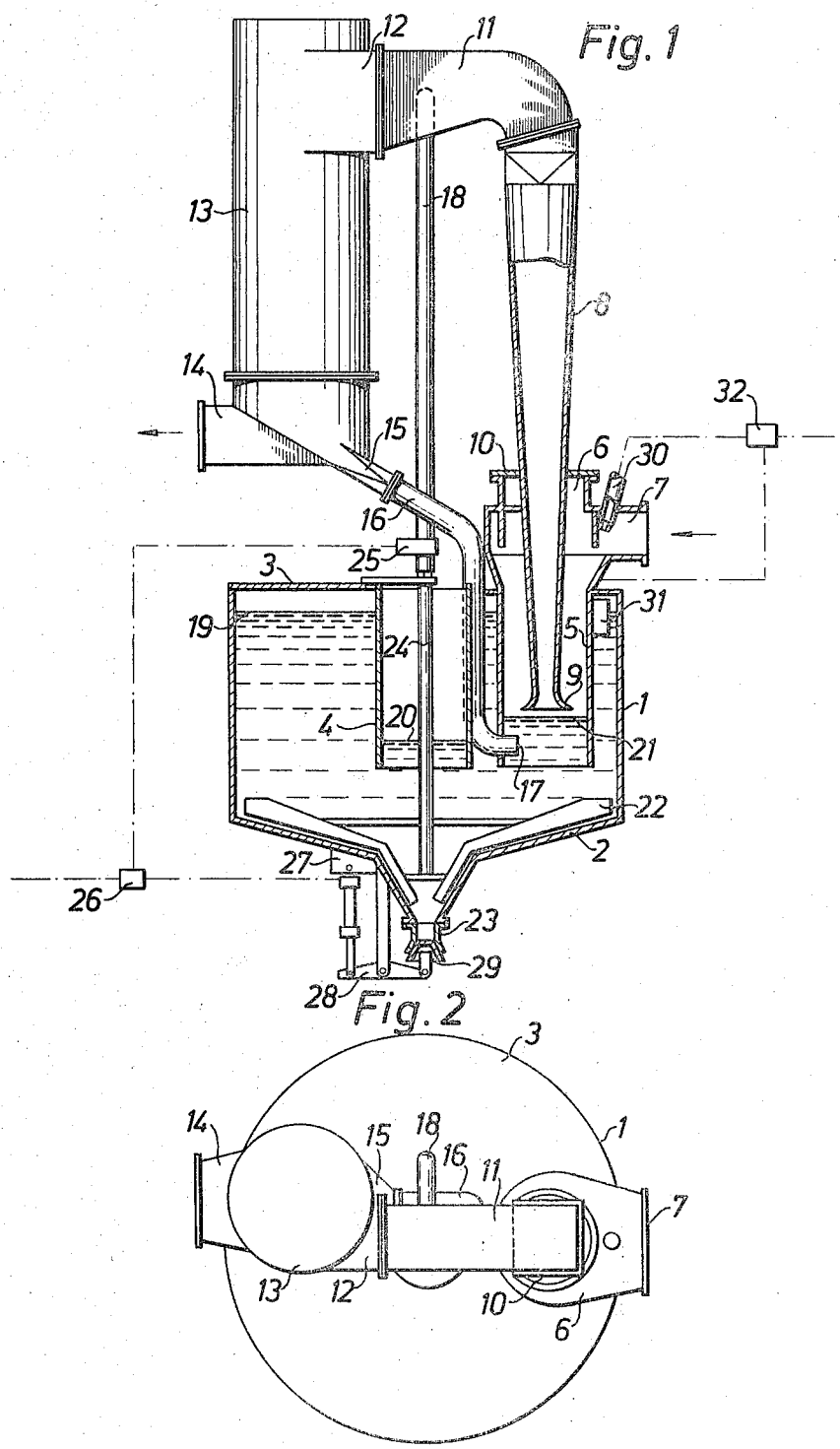

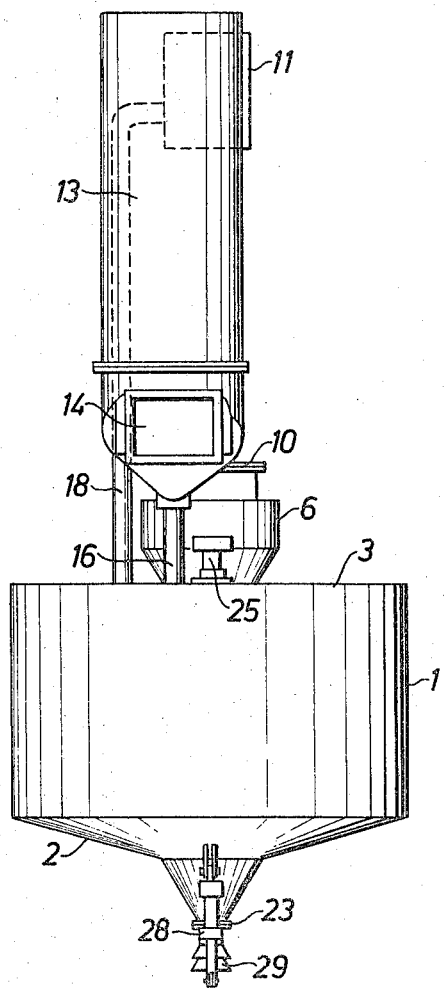

GAS CLEANING APPARATUS

The present invention relates to an apparatus for wet cleaning gas, including a liquid absorption zone which accomodates a body of liquid and is provided with a gas inlet so arranged that the gas is directed substantially at right angles down towards the surface of the liquid, a treatment passage which extends substantially perpendicularly upwards from the surface of the liquid and through which the gas flows while entraining from the liquid body liquid in droplet form, separator means for separating liquid droplets from the gas stream subsequent to the stream having passed the treatment passage, means for sedimenting solid material carried in the liquid and means for returning liquid from the separator means to the treatment zone.

Apparatus of this type but of varying design are well known from patent literature. In simple terms, the mode of operation of these apparatus is characterized by the fact that the gas stream is caused to strike perpendicularly against the surface of a liquid in a manner such that the liquid is atomized into minute droplets while losing energy contained in the gas stream. In conjunction therewith, the flow of gas laden with liquid droplets is caused to change its direction of movement through 180°, by flowing through a horizontally disposed slot into a treatment chamber, where the gas flows at right angles away from the surface of the liquid. Particularly good contact is obtained in the treatment chamber between the liquid and the gas. It should be noted that the total specific surface area of the droplets is very large.

The main advantage of this principle is that the water can be highly atomized without it being necessary to use means which rapidly become unusable as a result of clogging. A further advantage of almost equal importance resides in the adaptability of the system to different functions (adsorption and other chemical processes, moistening, evaporation), dust separation (with widely varying properties with respect to density, particle size, wetting tendency) and its flexibility with respect to size and the manner in which it is embodied in the system.

In the case of apparatus of this type intended for the chemical treatment of a relatively clean gas with a substantially constant rate of flow, the water droplets separated from the gas can - in certain instances - be returned direct to the lower portion of the body of water in the container, which accomodates the water take-up zone, the sludge being permitted to settle therein. In such instances, the amounts of sludge obtained are small, but in spite of this one prerequisite is that the sludge is able to settle, otherwise it is impossible to obtain an acceptable degree of sedimentation within the restricted treatment space. It should be noted that the quantity of water returned is quite considerable and that this unfavourably affects sedimentation of the sludge. Depending on the size of the set pressure drop, the quantity of liquid circulated in the system of a flue gas scrubber of normal size is from 20 to 40 m³/h. A slightly smaller amount is returned to the liquid bath without completing the circulation circuit, i.e., via the inner walls of the treatment chamber.

When concerned with applications of the system in which there are formed large quantities of sludge, e.g., in the absorption of a gaseous pollutant, such as $SO_2$ with an alkaline washing liquid, a separate sedimentation tank has been introduced in order to permit undisturbed sedimentation of the sludge. Furthermore, with an apparatus of this type a special alkali dissolver is also required.

To allow the apparatus to be adapted for varying quantities of smoke, it has been found suitable to operate with a constant pressure drop across the scrubber. This requires the location of a liquid surface much higher than the surface in the scrubber tank corresponding to this pressure, which implies the need of a further container.

In the case of gas purification, the efficiency obtained is a function of the energy lost, i.e., the pressure drop across the scrubber. In order to separate $SO_2$ from the gas to an acceptable extent, i.e., to approximately 99 percent, a pressure drop of the order of 200 mm is required. In order that the so called counter flow principle can be used, it is usual in practice to divide this pressure drop between two separate scrubbers connected in series in the path of the gas stream and to feed "fresh" washing liquid into the scrubber through which the gas passes through last.

An apparatus of the type described above is suitable for cleaning gas on a large scale, but because of the large number of tanks required together with associated conduits and pumps it is too complicated and expensive for use with a number of applications.

Summary of the Invention

The main object of the invention is to provide a more compact apparatus. A troublesome factor in this connection is the sedimentation tank, which requires a large volumetric capacity. One reason for this is because it has been found more suitable in certain instances to use limestone instead of hydrated lime as an alkali in the washing liquid of the sedimentation zone for absorbing gaseous pollutants such as $SO_2$ in the gas stream. The use of limestone, however, requires a longer contact time between the washing liquid and the substance to be washed than was earlier necessary. Consequently, it is necessary to use far larger total quantities of liquid in the apparatus, which extra liquid must be accomodated in the system. In accordance with the invention, the space required to accomodate the increased quantity of liquid can be added without disadvantage to the sedimentation tank.

It has been found that the liquid absorption zone can be advantageously added to the sedimentation tank without deleteriously affecting the sedimentation of the sludge, provided that said zone is arranged in the sedimentation tank within a vertical, downwardly open casing within which the treatment passage partially extends and into which issues the liquid conduit extending from the droplet separator.

Brief Description of the Drawings

FIG. 1 is a side view of an apparatus according to the invention, seen partly in section, FIG. 2 is a plan view of the apparatus, and FIG. 3 is an end view of the same apparatus.

Description of the Preferred Embodiment

The apparatus according to the invention comprises a generally cylindrical liquid container 1 having a conical bottom 2. The container 1 is closed at the top thereof with a cover member 3 provided with a central opening. A casing 4 extends down in the container coaxially therewith and terminates at a distance from the conical bottom 2. A second cylindrical casing 5 is arranged at the side of the casing 4 in an opening in the cover member 3 and communicates with an inlet chamber 6 which is arranged above the casing 5 and which has an outwardly projecting inlet 7 for connection to a conduit carrying the gas to be cleaned. A treatment passage 8, provided with an inlet portion 9 which tapers inwardly from the bottom upwards and then widens outwardly with a small degree of conicicity, extends from a level between the lower edge surface of the casing 5 and the cover member 3 coaxially up through the casing and the inlet chamber 6 and through the upper wall 10 thereof to a level located at a relatively considerable distance above the wall 10. The treatment passage is connected at the top, via a curved passage 11, to a horizontal inlet pipe 12 of a droplet separator 13. The droplet separator 13 is provided at the bottom thereof with a horizontally extending gas outlet pipe 14 intended to be connected, via a conduit, to a fan for sucking gas through the apparatus, and with an obliquely downwardly extending liquid outlet pipe 15 from which a liquid conduit 16 extends first obliquely downwardly and then vertically through the cover member 3 down into the container 1 to a level between the bottom edge surface of the casing 5 and the lower end of the passage 8, where it passes horizontally through the casing 5 and is terminated with an open end 17 located within the casing.

The gas passage 11 is connected with the container 1 via a tube 18 above the level of the liquid in the container and externally of the casing 4. When the apparatus is in operation the same pressure (below atmospheric pressure) is therefore set at the two mentioned positions, and thus when the fan rotates the level of liquid 19 externally of the casing 4 is higher than the level 20 within the casing 4 (in which the prevailing pressure is atmospheric). The level 21 of the liquid inside the casing 5 is slightly higher than the level of the liquid inside the casing 4 and the quantity of liquid in the container should be so adjusted in relation to prevailing gas velocities that the liquid level in the casing 5 lies somewhat below the mouth 9 of the passage 8, as illustrated.

During operation of the apparatus, the gas flows from the inlet 7, via the inlet chamber 6, vertically downwards in the annular space between the casing 5 and the treatment passage 8 and strikes the level of liquid 21. The gas atomises the liquid at the surface and entrains droplets of liquid during its continued flow vertically upwards through the treatment chamber, in which the main contact between liquid and gas takes place. This effect is well known. A portion of the liquid is deposited on the walls of the passage and runs down along the same, while the remaining droplets accompany the gas through the passage 11 to the droplet separator 13, in which they are substantially separated from the gas. The gas substantially freed from droplets passes out through the outlet 14, while the liquid runs down through the tube 16 to the bottom portion of the casing 5. The liquid returning through the pipe 16 to the casing 5 contains solid material which settles in the container 1.

A rotating scraper device provided with blades 22 arranged to move over the conical bottom 2 is arranged to feed the deposited sludge towards an outlet 23 located in the centre of the conical bottom 2. The scraper is supported by a vertical shaft 24 passing through the casing 4 and driven by a motor 25. The motor is provided with means for sensing the resistance exerted on the scraper when the scraper is in operation, the sensing means actuating a device 27, via a suitable control means 26, to open a valve 29 via a linkage mechanism 28 for the bottom outlet when the resitance felt by the scraper reaches a certain level. In this manner the deposited sludge is removed immediately it has thickened to a suitable degree.

To compensate for losses in liquid while draining off sludge and that liquid lost through evaporation, a nozzle 30 is mounted in the gas inlet 7 and a level sensing device 31 is arranged in the container 1 to cause, via a suitable regulator 32, replacement liquid to be fed to the system when the level falls beneath a determined value.

Because the feed back liquid from the droplet separator 13 is returned to the liquid take-up zone of the apparatus, which zone is shielded from the container in general by means of the casing 5, it is possible for solid material absorbed in the liquid to fall freely in said zone without contributing to movement of the liquid in the container.

I claim:

1. A gas cleaning apparatus comprising: a liquid take-up means for directing a gas stream towards a liquid surface in a liquid take-up zone and causing said gas to absorb liquid in the form of droplets, a treatment passage which extends from the liquid take-up zone and through which the gas with liquid droplets flows away from the liquid take-up zone, a liquid droplet separator connected to the treatment passage and from which the liquid separated from the gas in the droplet separator is returned to the system, and a sedimentation means for settling solid material removed from said gas in a sedimentation liquid zone which communicates with the liquid take-up zone, said sedimentation means and the liquid take-up means being enclosed in a common container, said liquid take-up zone being separated from the sedimentation zone by a downwardly open casing containing said take-up zone, a gas inlet connected to said casing through which said gas is directed at said liquid surface, a gas outlet provided for said casing by a portion of the treatment passage extending into the casing through its top end to an intermediate position below said gas inlet and above said liquid surface, said gas inlet and said gas outlet passing through the same opening in said common container containing the sedimentation zone, and a liquid conduit extending from the droplet separator and having it output end opening out into the container at a position within the said casing below said liquid surface and which is spaced from the sedimentation zone.

2. An apparatus according to claim 1, in which there is arranged in the sedimentation zone of the container a conveying means for conveying the sediment to a discharge means which is arranged to be opened automatically by a control means in response to an increase in resistance to movement of said conveying means above a predetermined value whereby the deposited sludge is discharged from the container with a thicker consistency.

3. An apparatus in accordance with claim 1 which also includes a gas absorbing liquid provided in the sedimentation zone to absorb gaseous pollutants in said gas stream.

* * * * *